(12) United States Patent
Trevino et al.

(10) Patent No.: US 10,273,952 B2
(45) Date of Patent: Apr. 30, 2019

(54) RECIPROCATING COMPRESSOR, PRESSURE PACKING, AND METHOD

(75) Inventors: Carlos Alfredo Trevino, Houston, TX (US); Vinh K. Do, Oklahoma City, OK (US); Tomasz Tomaszewski, Warsaw (PL); Jeffrey Allen Raynal, Houston, TX (US)

(73) Assignee: Nuovo Pignone Srl, Florence (IT)

( * ) Notice: Subject to any disclaimer, the term of this patent is extended or adjusted under 35 U.S.C. 154(b) by 893 days.

(21) Appl. No.: 14/410,368

(22) PCT Filed: Jun. 22, 2012

(86) PCT No.: PCT/PL2012/000047
§ 371 (c)(1),
(2), (4) Date: Oct. 16, 2015

(87) PCT Pub. No.: WO2013/191571
PCT Pub. Date: Dec. 27, 2013

(65) Prior Publication Data
US 2016/0138584 A1    May 19, 2016

(51) Int. Cl.
*F04B 39/04* (2006.01)
*F04B 53/02* (2006.01)
(Continued)

(52) U.S. Cl.
CPC .......... *F04B 53/02* (2013.01); *F04B 39/0022* (2013.01); *F04B 39/041* (2013.01);
(Continued)

(58) Field of Classification Search
CPC .... F04B 53/02; F04B 39/041; F04B 39/0022; F04B 53/18; F04B 39/12; F04B 53/04;
(Continued)

(56) References Cited

U.S. PATENT DOCUMENTS 1,526,909 A * 2/1925 Hiller .................... F04B 39/041
                                                    417/439
3,351,396 A * 11/1967 Oechslin ................. F01D 11/00
                                                    277/347
(Continued)

FOREIGN PATENT DOCUMENTS

CN    101832248 A    9/2010
EP     1394452 A1    3/2004
(Continued)

OTHER PUBLICATIONS

International Invitation to Pay Additional Fees issued in connection with corresponding PCT Application No. PCT/PL2012/000047 dated Feb. 19, 2013.
(Continued)

*Primary Examiner* — Michael Leslie
*Assistant Examiner* — Abiy Teka
(74) *Attorney, Agent, or Firm* — Global Patent Operation; Marc A. Vivenzio

(57) ABSTRACT

A pressure packing for a piston rod of a reciprocating compressor includes a case having a piston rod through bore. A compartment within the case is coincident with the through bore and the compartment has an axial length at least as long as a stroke of the piston rod.

20 Claims, 6 Drawing Sheets

(51) Int. Cl.
*F04B 53/16* (2006.01)
*F04B 39/00* (2006.01)
*F04B 39/12* (2006.01)
*F04B 53/04* (2006.01)
*F04B 53/06* (2006.01)
*F04B 53/14* (2006.01)
*F04B 53/18* (2006.01)
*F16J 15/56* (2006.01)

(52) U.S. Cl.
CPC ............ *F04B 39/12* (2013.01); *F04B 53/04* (2013.01); *F04B 53/06* (2013.01); *F04B 53/14* (2013.01); *F04B 53/164* (2013.01); *F04B 53/18* (2013.01); *F16J 15/56* (2013.01)

(58) Field of Classification Search
CPC ........ F04B 53/14; F04B 53/06; F04B 53/164; F16J 15/56
See application file for complete search history.

(56) References Cited

U.S. PATENT DOCUMENTS

| | | | |
|---|---|---|---|
| 3,516,760 | A | 6/1970 | Dettinger |
| 3,875,806 | A | 4/1975 | Brewster |
| 3,916,771 | A | 11/1975 | Nendzig et al. |
| 7,963,211 | B2 | 6/2011 | Feraille |
| 2003/0030228 | A1 | 2/2003 | Graziani et al. |
| 2009/0295096 | A1 | 12/2009 | Wood |
| 2010/0291659 | A1 | 11/2010 | Strickland |
| 2012/0211945 | A1* | 8/2012 | Lindner-Silwester .......... F04B 39/0094 277/508 |

FOREIGN PATENT DOCUMENTS

| | | |
|---|---|---|
| FR | 1215958 A | 4/1960 |
| FR | 2499634 A1 | 8/1982 |
| GB | 547455 A | 8/1942 |
| JP | 07151404 A | 6/1995 |
| JP | 09292163 A | 11/1997 |
| JP | 2003074708 | 3/2003 |
| JP | 2009062871 | 3/2009 |
| JP | 2010043730 | 2/2010 |

OTHER PUBLICATIONS

International Search Report and Written Opinion issued in connection with corresponding PCT Application No. PCT/PL2012/000047 dated Apr. 15, 2013.
Unofficial English Translation of Japanese Office Action issued in connection with corresponding JP Application No. 015518361 dated Jul. 5, 2016.
API Specification 11P, "Specification for Packaged Reciprocating Compressor for Oil and Gas Production Services", American Petroleum Institute, pp. 1-83, Nov. 1, 1989.
API Standard 618, "Reciprocating Compressors for Petroleum, Chemical, and Gas Industry Services", Downstream Segment, pp. 1-142, Dec. 2013.
Unofficial English Translation of Chinese Office Action issued in connection with corresponding CN Application No. 201280074159.7 dated Feb. 15, 2016.

* cited by examiner

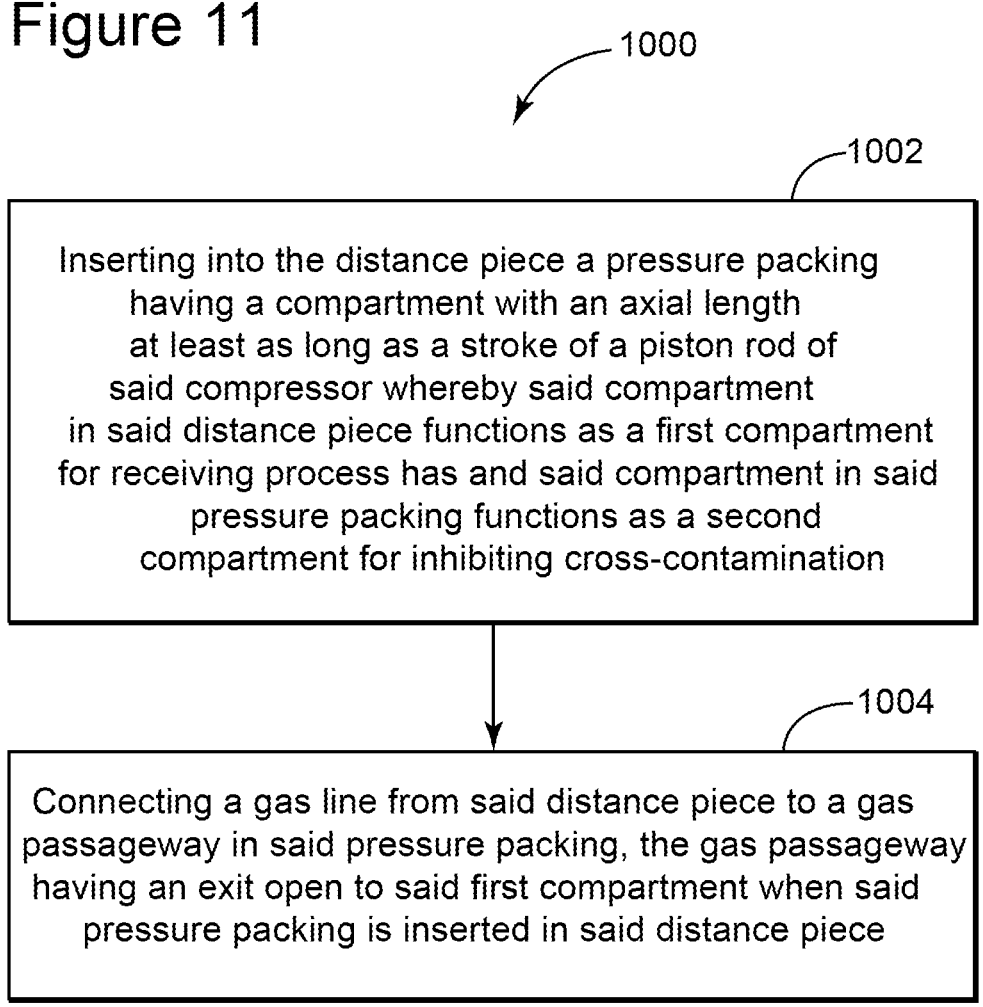

RECIPROCATING COMPRESSOR, PRESSURE PACKING, AND METHOD

BACKGROUND

Technical Field

Embodiments of the subject matter disclosed herein generally relate to reciprocating compressors, and more particularly, to a pressure packing for a reciprocating compressor.

Discussion of the Background

A reciprocating compressor frame typically includes a crankcase, crosshead guide, distance piece and cylinder. An oil lubricated and bearing mounted crankshaft in the crankcase is rotated by way of an input shaft connected to a prime mover such as an internal combustion engine. A connecting rod extends between the crankshaft and a cross-head slidably mounted in the crosshead guide. The crosshead guide guides the cross-head and connecting rod to convert the rotating motion of the crankshaft into a reciprocating linear motion at the cross-head. A distance piece, discussed further below, is disposed between the crosshead guide and the cylinder and a piston rod connected to the cross-head extends through the distance piece to a piston in the cylinder. A first one way valve at the cylinder body allows process gas to be drawn into the cylinder during the suction stroke and another one way valve at the cylinder body allows process gas to exit the cylinder upon reaching a predetermined pressure. In this manner, a process gas, for example, natural gas, may be compressed for use, further processing, and/or transport.

The typical distance piece includes a pressure packing extending around the piston rod to seal the cylinder and piston and rod assembly of the compressor. A piston rod wiper may also be included in the distance piece to remove lubricant deposited on the piston rod from the crankcase side.

The distance piece may be configured to provide a separation distance between the crank end side and the cylinder to prevent cross-contamination between compressor lubricant and process gas. More specifically, a compartment in the distance piece may be configured with a length sufficient to prevent any part of the reciprocating piston rod from entering both the piston rod wiper and the pressure packing. An oil slinger may also be included on the piston rod in the compartment to inhibit migration of lubricant toward the pressure packing.

For further sealing control and prevention of cross-contamination, a distance piece may be provided with an inboard compartment, discussed above, and an outboard compartment separated from the inboard compartment by a partition wall including a partition seal. Other types of controls may also be implemented, for example, the inboard and/or outboard distance piece may be configured to be purged with an inert gas vented to a sealed container. As another example, coolant and/or lubrication may be separately provided to the pressure packing in the outboard compartment.

The type of distance piece that is used, e.g., single compartment or inboard/outboard compartment, and the manner in which the distance piece and/or the pressure packing are managed, e.g., by purging, venting, etc., may be determinative of what type of process gas may be compressed with the reciprocating compressor, see for example, *Reciprocating Compressors for Petroleum, Chemical, and Gas Industry Services, API Standard* 618, and/or *Specification for Packaged Reciprocating Compressors for Oil and Gas Production Services* published by the American Petroleum Institute, *ISO* 13631, and incorporated herein by reference. For example, natural gas generally free of hydrogen sulfide, so-called sweet gas, may be compressed with a single compartment reciprocating compressor. However, natural gas including significant amounts of hydrogen sulfide, so-called sour gas, and other gases considered hazardous, corrosive, or otherwise toxic are oftentimes required to be compressed by a reciprocating compressor having a distance piece with two compartments. Such compressors may further require purging and venting of the pressure packing between the distance piece and the cylinder assembly.

If a reciprocating compressor is used in a location where the process gas changes from sweet gas to sour gas, it may be necessary to reconfigure the compressor with a two compartment distance piece so that further control may be applied to the process gas. This change oftentimes requires modifying or replacing other compressor components to accommodate the change, for example, a longer piston rod may be required to accommodate the second compartment of the two compartment distance piece. Oftentimes the entire footprint of the reciprocating compressor is also affected and thus, further time and expense must be invested to change components located peripherally of the compressor. Not only are these changes time consuming, expensive, and oftentimes difficult to carry out, the additional components introduced to the compressor add a greater level of mechanical complexity and thus render the compressor more prone to failures such as leaking.

What is needed then is a reciprocating compressor, and more particularly, a pressure packing, which allows the reciprocating compressor to be more readily converted to compress different types of gas, to be more easily serviced, and to be more reliable and less prone to leakage.

SUMMARY

According to an exemplary embodiment, a pressure packing for a piston rod of a reciprocating compressor includes a case having a piston rod through bore. A compartment within the case is coincident with the through bore and the compartment has an axial length at least as long as a stroke of the piston rod.

According to another exemplary embodiment, a reciprocating compressor includes a piston rod, a pressure packing around the piston rod, and a distance piece. The pressure packing is at least partially disposed within the distance piece. A first compartment is configured to receive process gas leaking along the surface of the piston rod from the pressure packing and a second compartment within the pressure packing is configured to inhibit lubricant on the piston rod from entering the first compartment.

According to another embodiment, a method of converting a sweet gas reciprocating compressor to a sour gas reciprocating compressor, where the sweet gas reciprocating compressor has a distance piece with a single compartment includes, inserting into the distance piece a pressure packing having a compartment with an axial length at least as long as a stroke of a piston rod of the compressor, whereby the compartment in the distance piece functions as a first compartment for receiving process gas and the compartment in the pressure packing functions as a second compartment for inhibiting cross-contamination, and, connecting a gas line from the distance piece to a passageway in the pressure packing, the passageway having an exit open to the first compartment when the pressure packing is inserted.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 11 is a flow chart illustrating a method of converting sweet gas reciprocating compressor to sour gas reciprocating compressor according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a reciprocating compressor system. However, the embodiments to be discussed next are not limited to these exemplary systems, but may be applied to other systems.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
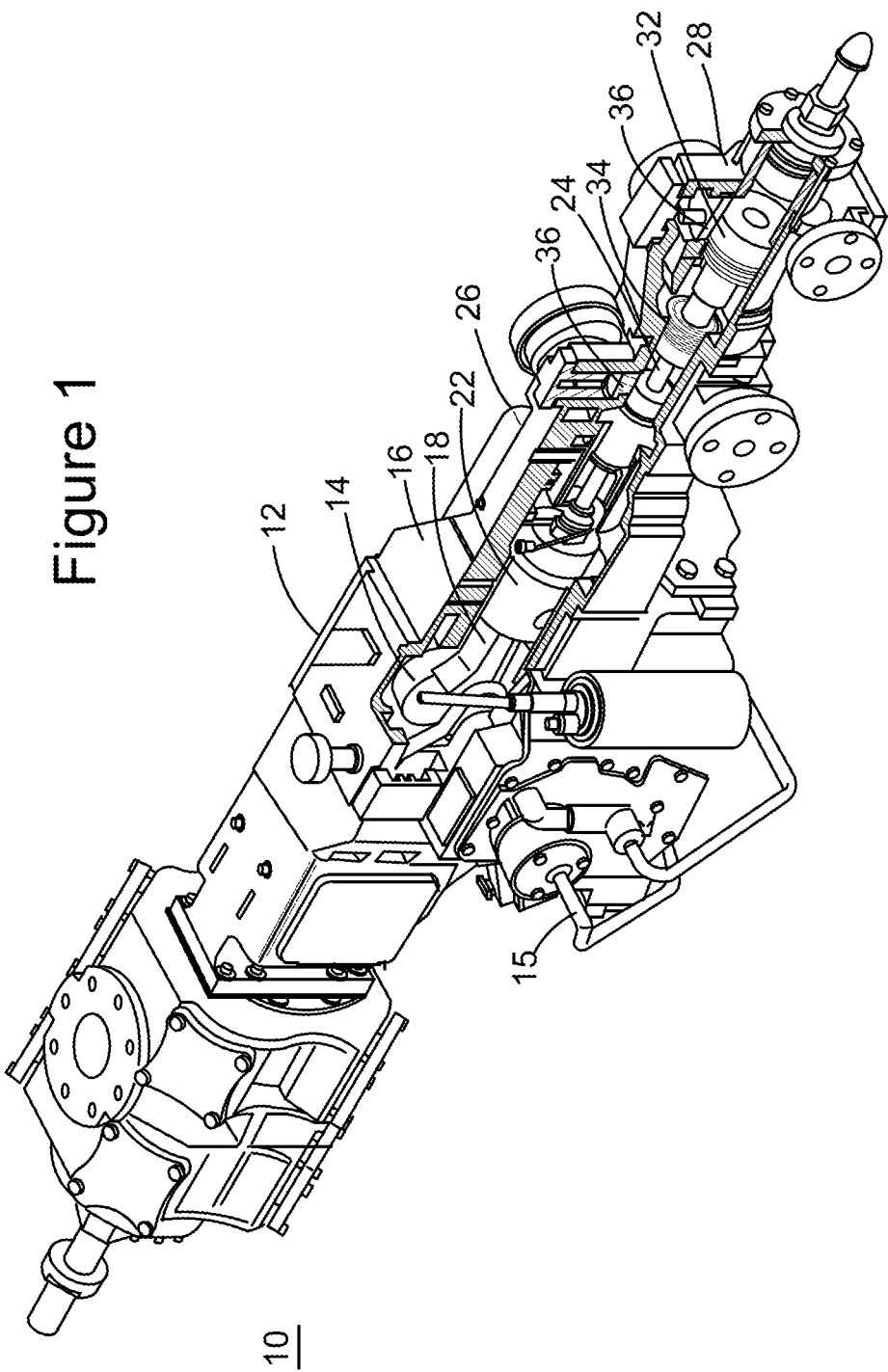
FIG. 1 is a perspective view of an exemplary embodiment.

FIG. 1 shows an exemplary embodiment of a reciprocating compressor 10 according to the present invention. The frame of compressor 10 includes a crankcase 12 having a crankshaft 14 rotatably mounted therein. Compressor 10 is provided in a two throw configuration with compressor sections extending in opposite directions from crankcase 12. One skilled in the art will appreciate that other exemplary embodiments may include any number of throws including one, four, eight, etc. Each compressor section includes a crosshead guide 16 having a cross-head 22 slidably disposed therein. A connecting rod 18 extends between the crankshaft 14 and the crosshead 22. From crosshead 22, a piston rod 24 extends through a distance piece 26 into a cylinder 28 to pistons 32 and 34. Cylinder 28 includes valves 36 configured to allow process gas to flow into and out of the work spaces of the cylinder during the suction and compression stages of the compression cycle.

Figure 2:
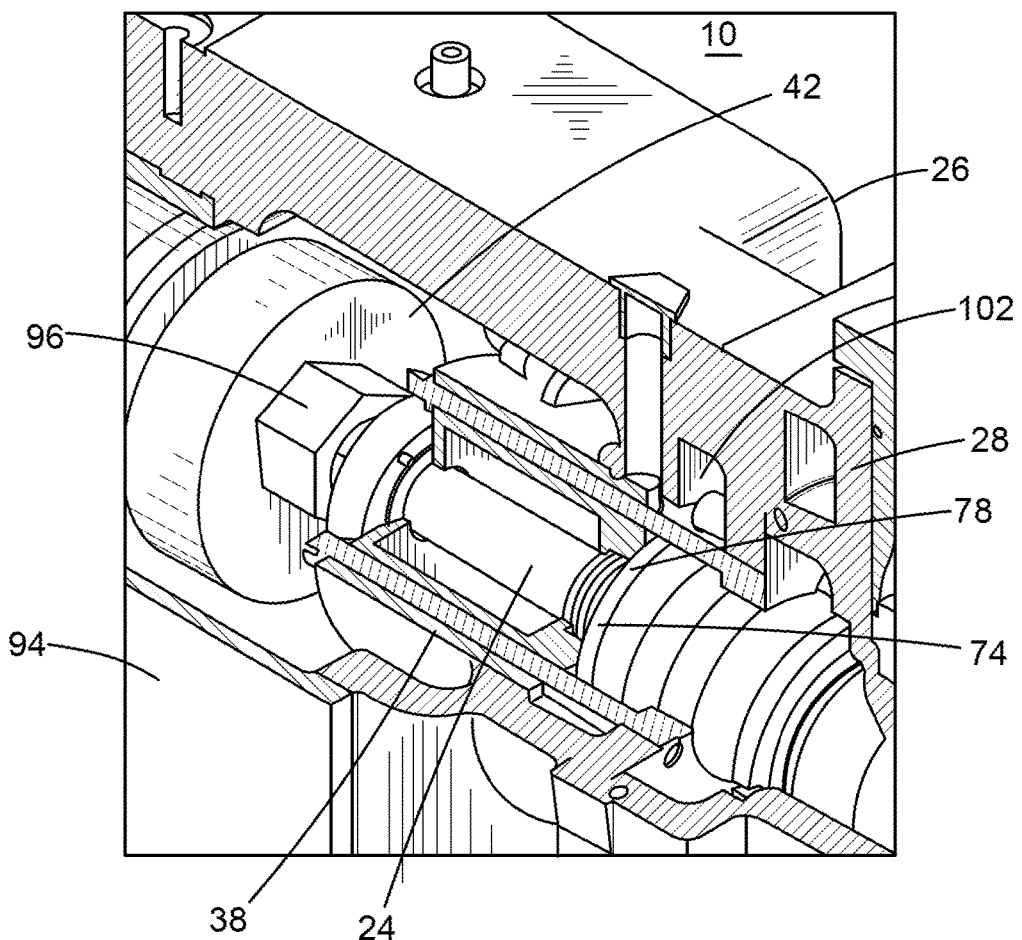
FIG. 2 is a close up cut away view of the exemplary embodiment shown in FIG. 1.
Figure 3:
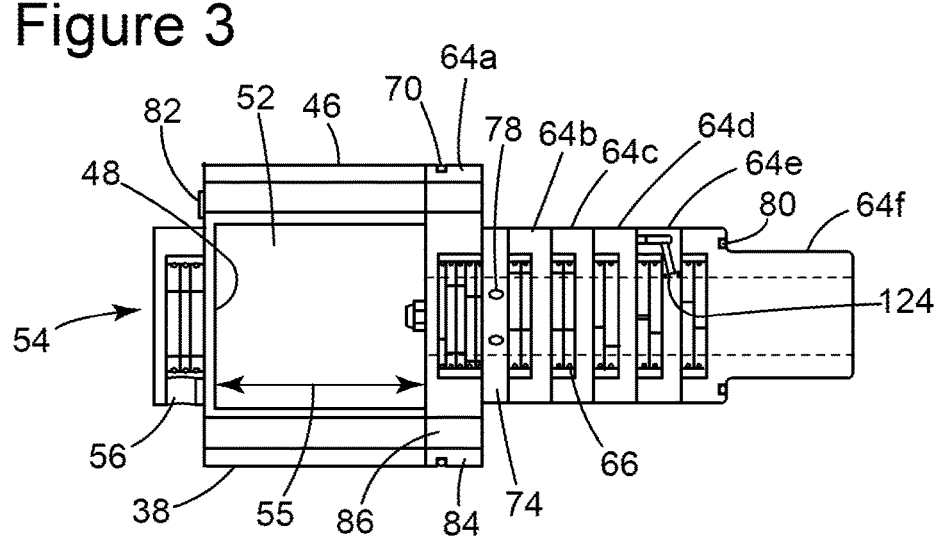
FIG. 3 is a cross-sectional view of a pressure packing of the embodiment shown in FIG. 1.
Figure 4:
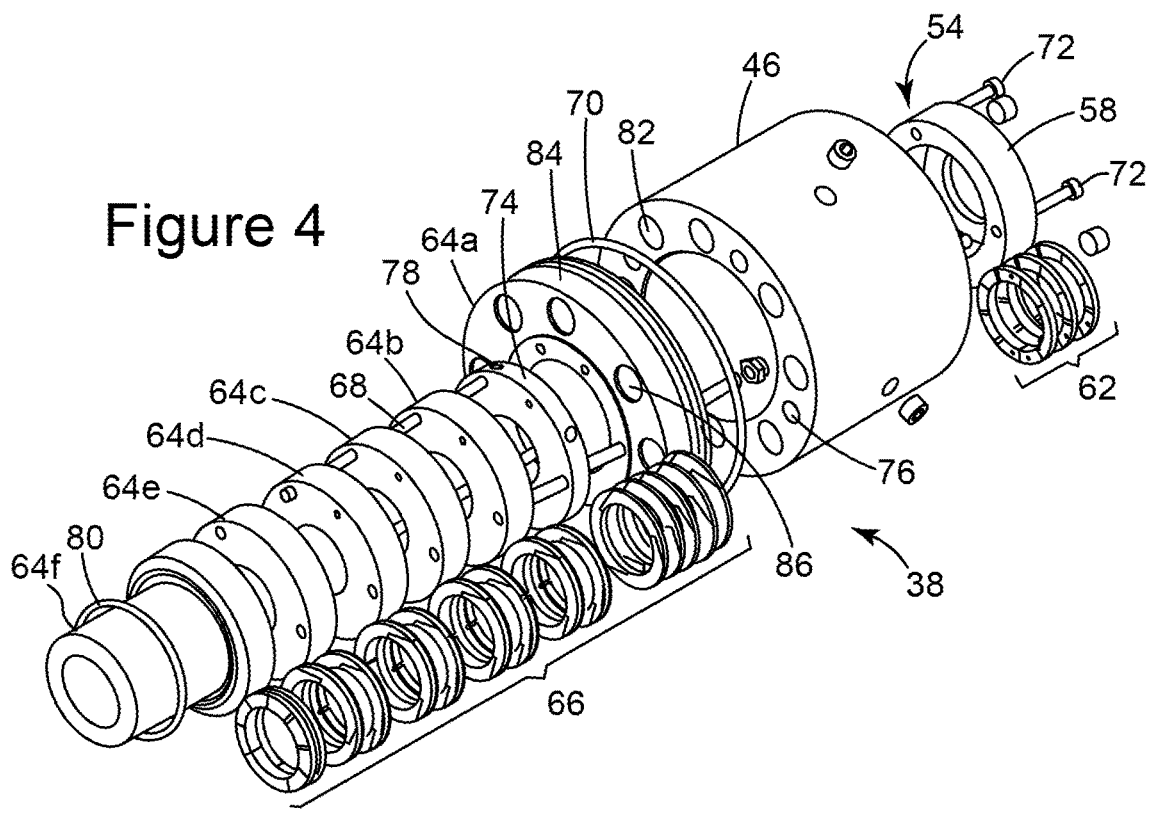
FIG. 4 is an exploded view of the pressure packing shown in FIG. 3.

As shown in the close up cutaway view of FIG. 2, compressor 10 includes a pressure packing 38 extending from a cavity 42 of distance piece 26 into cylinder 28. A detailed view of pressure packing 38 is shown in FIGS. 3 and 4. Pressure packing 38 includes a case 46 having a piston rod through bore 48 and a compartment 52 within case 46 and coincident with through bore 48. At one end of case 46, pressure packing 38 includes a piston rod wiper 54 having a wiper body 58 (FIG. 4) with a drain 56 (FIG. 3) and a plurality of wiper rings 62 (FIG. 4). At the other end of case 46, pressure packing 38 includes a plurality of packing bodies 64a to 64f each having a plurality of piston rod sealing rings 66 around through bore 48. As shown in FIG. 4, tie rods 68 extending through the packing bodies 64 secure the packing bodies 64a to 64f and rings 66 to the case 46. Wiper body 58 is similarly connected to case 46 with fasteners 72, as further shown in FIG. 4.

As shown in FIGS. 3 and 4, a packing ring 74 is provided between the first packing body 64a and second packing body 64b. As will be further described below, a gas passageway 76 extends from packing case 46, through the first packing body 64a, and into the packing ring 74. Gas passageway 76 terminates at orifices 78 in ring 74.

Figure 5:
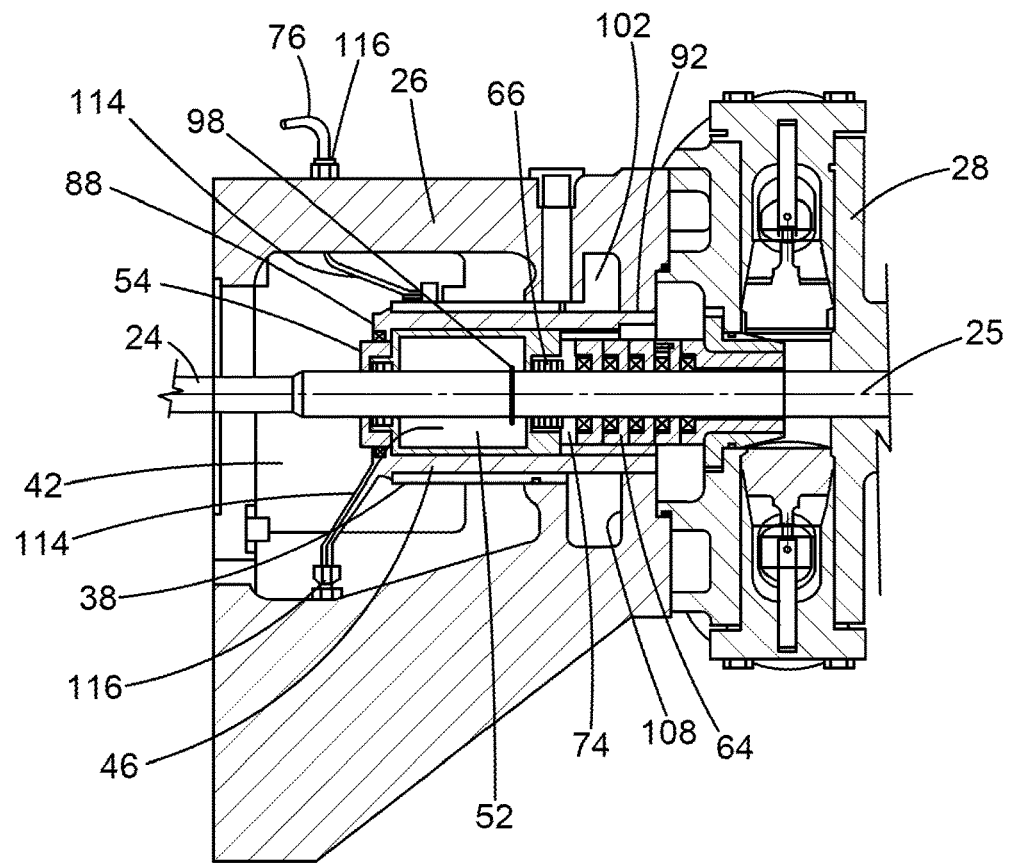
FIG. 5 is a cross-sectional view of the distance piece and pressure packing of the exemplary embodiment shown in FIG. 1.
Figure 6:
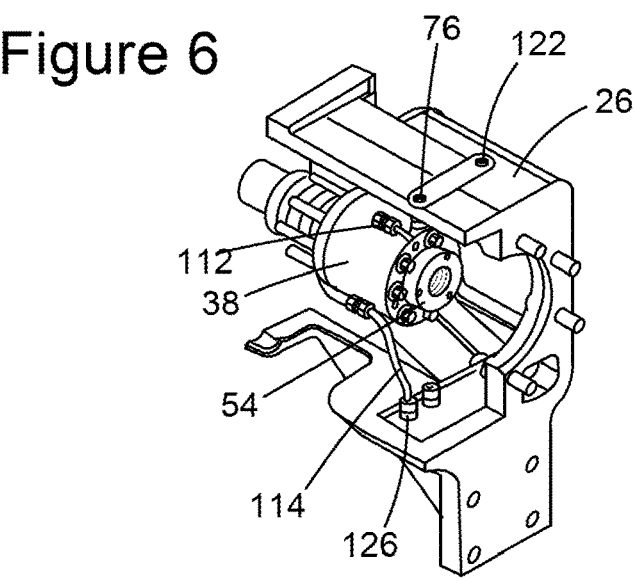
FIG. 6 is a cut away perspective view of the distance piece and pressure packing of the exemplary embodiment shown in FIG. 1.

FIGS. 5 and 6 show details of compressor 10 with pressure packing 38 installed in compressor 10. Pressure packing 38 extends around piston rod 24 and is connected to distance piece 26 by threaded bolts 88 extending through holes 82 in case 46 and holes 86 in flange 84 of first packing body 64a.

As may be appreciated in FIG. 5, compressor 10 includes a compartment 102 within distance piece 26. In the embodiment shown, compartment 102 is formed by the outer surface of pressure packing 38 and an inner surface 108 of distance piece 26. Compartment 102 in distance piece 26 and compartment 52 in packing case 46 may provide the benefits of a two compartment distance piece, such as that previously discussed. However, unlike conventional compressors having two compartments formed by the distance piece, compressor 10 may provide dual compartment functionality where one of the compartments is provided inside the pressure packing 38. This and other features, which will be discussed in greater detail below, allow compressor 10 to be easily converted to compress different types of gas, simply by changing the pressure packing.

As shown in FIG. 5, compartment 52 may function as a second compartment to the first compartment 102 defined by packing bodies 64b-c and distance piece 26. Thus, where first compartment 102 may be configured to receive process gas leaked from packing rings 66, second compartment 52 may be configured to inhibit cross-contamination of compressor lubricant and process gas. For example, and as shown in FIG. 3, compartment 52 may be provided with an axial length 55 longer than a stroke of piston rod 24 thereby preventing any portion of piston rod 24 from entering both wiper 54 and packing bodies 64. Further, piston rod 24 may be provided with an oil slinger 98, as shown in FIG. 5, to prevent migration of lubricant on piston rod 24 towards packing bodies 64.

As further shown in FIG. 5, second compartment 52 is sealed from first compartment 102 by first packing body 64a. Note from FIG. 5 that first packing body 64a may include additional packing rings 66 to enhance the sealing between compartment 102 and compartment 52.

Figure 7:
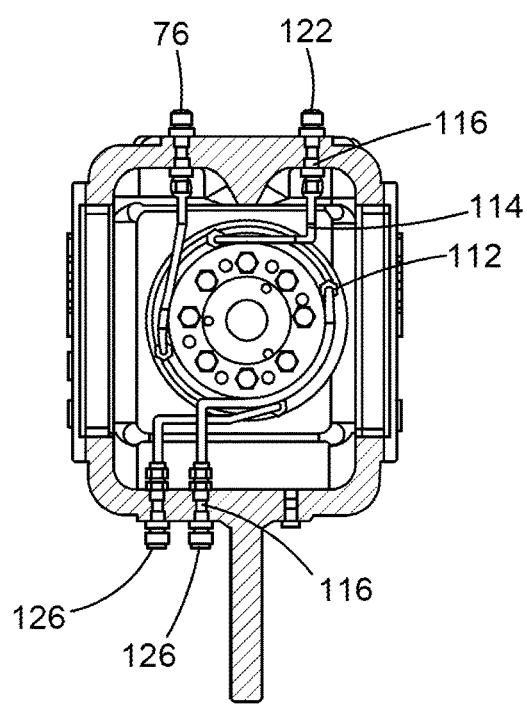
FIG. 7 is a cut away end view of the distance piece with the pressure packing installed of the exemplary embodiment shown in FIG. 1
Figure 9:
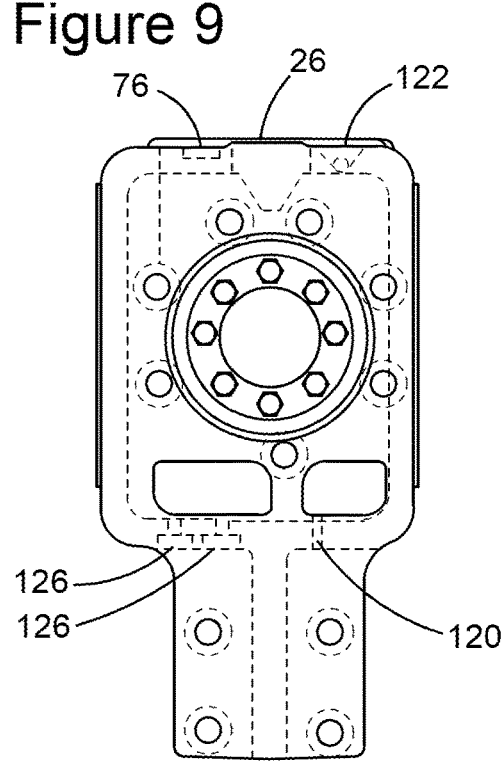
FIG. 9 shows an end view of the distance piece of FIG. 7.
Figure 10:
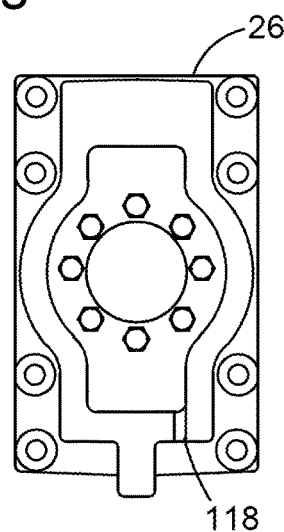
FIG. 10 shows another end view of the distance piece of FIG. 7.

As further shown in FIGS. 5 to 7, fittings 112 on casing 46 and fittings 116 on the distance piece 26 may be connected by tubing 114 to extend various passageways in pressure packing 38 to the exterior of compressor 10. As previously discussed, a purge gas passageway 76 extends within pressure packing 38 to orifices 78 in packing ring 74. During operation of compressor 10, an inert purge gas, such as nitrogen, may be delivered through passageway 76 to first compartment 102. As shown in FIGS. 5 to 7, other passageways may be provided by tubing extending between the exterior of compressor 10 and pressure packing 38. For example, a lubricant passageway 122 (FIGS. 7 and 9) may extend from the exterior of distance piece 26, through cavity 42, into a passageway (not shown) within packing case 46 and packing bodies 64a-e, to a lube orifice 124 in packing body 64e (FIG. 3). This feature may allow lubricant to be applied in situ for decreasing friction between the packing bodies 64a-e and piston rod 24. Similarly, a pair of venting passageways 126 (FIGS. 7 and 9) may extend to one or more orifices (not shown) in the first compartment 102 or second compartment 52, respectively. Each venting passageway 126 may be used, for example, to exhaust purge gas, process gas, and/or lubricant to a processing container (not shown) located exteriorly of distance piece 26.

Figure 8:
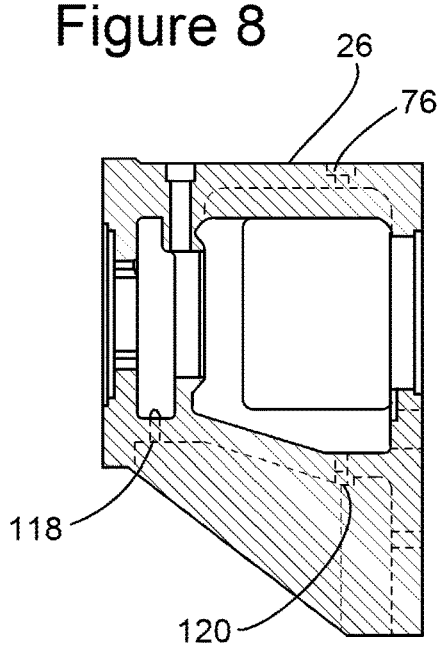
FIG. 8 shows a cross-sectional view of the distance piece of FIG. 7.

FIGS. 7 to 10 show distance piece 26 of compressor 10. As shown in FIG. 8, distance piece 26 may include a drain 118 for first compartment 102. Distance piece 26 may also include a drain 120 to receive lubricant from crosshead guide and drain 56 in wiper 54 (FIG. 3). Further, distance piece 26 may also include a packing case vent/drain 126 for second compartment 52 to remove lubricant, inert gas and leaking process gas or a mixture thereof to a safe location outside the compressor.

As may be appreciated from FIG. 3, pressure packing 38 presents a unitary sub-assembly and is thus easily handled by personnel during installation to compressor 10. Pressure packing 38 may be provided as original equipment or as a retrofit to allow a compressor originally configured with a single compartment distance piece to be easily converted to double compartment functionality.

For example, retrofit installation of pressure packing 38 can involve removing the side cover 94 (FIG. 2) from the distance piece 26, removing the cross-head nut 96 (FIG. 2) from the piston rod 24, sliding the piston rod 24 toward the cylinder 28, and removing an existing pressure packing (not shown). Then, as shown in FIG. 5, pressure packing 38 may be inserted to distance piece 26. In the embodiment shown in FIG. 5, the packing case bolt holes 82 and the flange 84 bolt holes 86 are aligned with threaded holes 92 in distance piece 26. O-ring 70 and gasket 80 engage distance piece 26 and cylinder 28, respectively. Threaded bolts 88 are then inserted through the holes 82 and 86 and into threaded engagement with the threaded holes 92 in distance piece 26 to secure pressure packing 38 to distance piece 26. In other embodiments not shown, various other means of securing pressure packing 38 within compressor 10 may be employed, for example, pressure packing 38 may be attached by fasteners to cylinder 28, or as another example, flange 84 on the first packing body may engage threads on the distance piece 26. After the through bore 48 of pressure packing 38 is coaxial with piston rod axis 25, piston rod 24 may be slid back through pressure packing 38 into engagement with cross-head 22 and the cross-head nut 96 may be connected to piston rod 24.

Oil slinger 98, which is an optional component, may be provided in either a full ring or split ring configuration. Installation may involve separating case 46 from packing body 64a and then securing oil slinger 98 to piston rod 24. In the embodiment shown in FIG. 5, compartment 52 has an axial length 54 sufficient to prevent oil slinger 98 from contacting either end of the compartment 52 during compressor operation. With the pressure packing bolted to the distance piece 26, the tubing sections 114 extending between the fittings 112 on casing 46 (FIG. 6) and the fittings 116 on distance piece 26 (FIG. 6) may be installed.

During operation, packing bodies 64a-f and piston rod sealing rings 66 may inhibit the flow of process gas out of cylinder 28. Process gas leaking through sealing rings 66 received in first compartment 102 may be purged with inert gas flowing through a first gas passageway 76 having orifices 78 exiting to first compartment. Then, purge gas combined with process gas, for example, sour gas, may be vented to a designated processing container through one of passageways 126. Also, second compartment 52 which is sealed from first compartment 102 by first packing body 64a may prevent oil from cross-contaminating with process gas since no part of the piston rod enters both the wiper 54 and the packing bodies 66 and further since oil slinger 98 prevents the migration of contaminated lubricant outside second compartment 52. In this manner, a compressor having a single compartment distance piece may be capable of providing the operating features of a compressor equipped with a two compartment distance piece and thus, converted for use with hazardous, corrosive and/or toxic gases, such as sour gas. Note that since the original distance piece 26 may be utilized, the footprint of the compressor and the location of the distance piece fittings 116 may remain unchanged when retrofitting compressor 10 to provide dual compartment functionality, thereby providing enhanced convenience and reduced costs.

Thus, according to an exemplary embodiment as shown in the flowchart of FIG. 11, a method (1000) of converting a sweet gas reciprocating compressor to a sour gas reciprocating compressor where the sweet gas reciprocating compressor has a distance piece with a single compartment, can include the steps of, inserting into the distance piece (1002) a pressure packing having a second compartment with an axial length at least as large as a stroke of a piston rod of the compressor, whereby the compartment in the distance piece functions as a first compartment for receiving process gas and the compartment in the pressure packing functions as a second compartment for inhibiting cross-contamination, and, connecting (1004) a gas line from the distance piece to a gas passageway in the pressure packing, the passageway having an exit open to the first compartment when the pressure packing is inserted in by the distance piece.

The above-described embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A pressure packing for a piston rod of a reciprocating compressor, the pressure packing comprising:
   a case comprising a piston rod through bore;
   a compartment within the case and coincident with the piston rod through bore, the compartment having an axial length at least as long as a stroke of the piston rod;
   a plurality of packing bodies;
   a packing ring between a first packing body and a second packing body; and
   a gas passageway extending from the case, through first packing body, and into the packing ring, the gas passageway comprising an exit defined by at least one radial orifice in the packing ring.

2. The pressure packing of claim 1, wherein the case further comprises a piston rod wiper at an end of the compartment.

3. The pressure packing of claim 1, wherein each packing body of the plurality of packing bodies comprises at least one piston rod sealing ring around the piston rod through bore.

4. The pressure packing of claim 1, wherein one of the packing bodies of the plurality of packing bodies comprises a flange comprising a plurality of bolt holes, and the case comprises a plurality of bolt holes coaxial with the bolt holes in the flange.

5. A two compartment assembly for a reciprocating compressor, the two compartment assembly comprising:
   a distance piece comprising a first compartment;
   a pressure packing within the distance piece, the pressure packing comprising a second compartment having an axial length at least as long as a stroke of a piston rod of the reciprocating compressor; and
   a gas passageway extending from outside the distance piece through the pressure packing to the first compartment.

6. A reciprocating compressor, comprising:
   a piston rod;
   a pressure packing around the piston rod;
   a distance piece, the pressure packing at least partially disposed within the distance piece;
   a first compartment configured to receive process gas from the pressure packing;
   a second compartment within the pressure packing configured to inhibit lubricant on the piston rod from entering the first compartment;
   a plurality of packing bodies;
   a packing ring between a first packing body and a second packing body; and
   a gas passageway extending from the case, through the first the packing body, and into the packing ring, the gas passageway comprising an exit defined by at least one radial orifice in the packing ring.

7. The reciprocating compressor of claim 6, wherein the piston rod comprises an oil slinger within the second compartment.

8. The reciprocating compressor of claim 6, wherein the pressure packing comprises a piston rod wiper packing at an end of the second compartment.

9. The reciprocating compressor of claim 6, wherein each of the plurality of packing bodies comprises at least one piston rod sealing ring around the piston rod.

10. The reciprocating compressor of claim 9, wherein the first packing body seals the second compartment from the first compartment.

11. The reciprocating compressor of claim 10, further comprising:
   a purge gas passageway comprising an opening to the first compartment.

12. The reciprocating compressor of claim 11, further comprising:
   a packing ring between the first one of the plurality of packing bodies and a second one of the plurality of packing bodies, the purge gas passageway extending from the distance piece, into the pressure packing, through the first the packing body, and into the packing ring, the purge gas passageway comprising an exit defined by at least one orifice in the packing ring.

13. The reciprocating compressor of claim 12, further comprising:
   a vent gas passageway; and
   a drain passageway,
   wherein each of the vent gas passageway and the drain passageway comprises an opening to the first compartment.

14. The reciprocating compressor of claim 13, wherein the first compartment is defined by an outer surface of the pressure packing and an inner surface of the distance piece.

15. The reciprocating compressor of claim 6, wherein the distance piece is a single compartment distance piece.

16. The reciprocating compressor of claim 15, wherein the distance piece comprises a plurality of threaded holes, at least one of the plurality of packing bodies comprises a flange having a plurality of bolt holes, and a tubular member comprises a plurality of bolt holes coaxial with the bolt holes in the flange and the threaded holes in the distance piece.

17. The reciprocating compressor of claim 16, further comprising:
   a plurality of threaded bolts each bolt extending through a respective one of the plurality of tubular member bolt holes, through a respective one of the plurality of flange holes, and into a respective one of the threaded bolt holes in the distance piece.

18. The reciprocating compressor of claim 17, wherein the bolts extend through the first compartment.

19. The reciprocating compressor of claim 13, wherein the wiper body comprises a drain, and the distance piece comprises the drain passageway comprising an opening to the drain of the wiper body.

20. A method of converting a sweet gas reciprocating compressor to a sour gas reciprocating compressor, the sweet gas reciprocating compressor having a distance piece with a single compartment, the method comprising:
   inserting into the distance piece a pressure packing having a compartment with an axial length at least as long as a stroke of a piston rod of the compressor, whereby the single compartment in the distance piece functions as a first compartment for receiving process gas and the compartment in the pressure packing functions as a second compartment for inhibiting cross-contamination;
   inserting a plurality of packing bodies, wherein a packing ring is inserted between a first packing body and a second packing body; and
   connecting a gas line from the distance piece to a gas passageway in the pressure packing, the passageway extending from the case, through a first packing body, and into a packing ring, the gas passageway comprising an exit defined by at least one radial orifice in the packing ring when the pressure packing is inserted in the distance piece.

* * * * *